United States Patent [19]
Chen et al.

[11] Patent Number: 5,993,517
[45] Date of Patent: Nov. 30, 1999

[54] TWO STAGE PRESSURE SWING ADSORPTION PROCESS

[75] Inventors: Yudong Chen, Bridgewater; Akhilesh Kapoor, New Providence; Ramakrishnan Ramachandran, Allendale, all of N.J.

[73] Assignee: The Boc Group, Inc., New Providence, N.J.

[21] Appl. No.: 09/040,035

[22] Filed: Mar. 17, 1998

[51] Int. Cl.[6] ................................................. B01D 53/053
[52] U.S. Cl. .................................. 95/98; 95/101; 95/105; 95/140; 423/247
[58] Field of Search ............................... 95/96–105, 140; 423/247

[56] References Cited

U.S. PATENT DOCUMENTS

| | | | |
|---|---|---|---|
| 3,864,452 | 2/1975 | Chi et al. ..................................... | 95/97 |
| 4,019,879 | 4/1977 | Rabo et al. ............................... | 95/140 |
| 4,726,816 | 2/1988 | Fuderer ................................. | 95/140 X |
| 4,732,577 | 3/1988 | Koizumi et al. ........................... | 95/101 |
| 4,892,565 | 1/1990 | Schmidt et al. ....................... | 95/140 X |
| 4,913,709 | 4/1990 | Kumar ...................................... | 95/100 |
| 4,914,218 | 4/1990 | Kumar et al. .............................. | 95/100 |
| 5,096,470 | 3/1992 | Krishnamurthy ......................... | 95/102 |
| 5,106,396 | 4/1992 | Mitariten ................................ | 95/140 X |
| 5,112,590 | 5/1992 | Krishnamurthy et al. ............ | 95/140 X |
| 5,248,322 | 9/1993 | Kumar ................................. | 95/140 X |
| 5,354,346 | 10/1994 | Kumar ................................. | 95/140 X |
| 5,529,763 | 6/1996 | Peng et al. ........................... | 95/140 X |
| 5,531,809 | 7/1996 | Golden et al. ........................ | 95/140 X |
| 5,542,966 | 8/1996 | D'Amico et al. ......................... | 95/101 |
| 5,547,492 | 8/1996 | Cho et al. ................................. | 95/100 |
| 5,707,425 | 1/1998 | D'Amico et al. ......................... | 95/101 |

*Primary Examiner*—Robert H. Spitzer
*Attorney, Agent, or Firm*—Philip H. Von Neida; Salvatore P. Pace

[57] ABSTRACT

High purity carbon monoxide is separated from a gas stream containing carbon monoxide, carbon dioxide, methane, hydrogen and possibly other impurities by a two-stage pressure swing adsorption process carried out in a series of adsorption vessels containing adsorbent which adsorbs carbon monoxide more readily than other components of the gas stream. The first adsorption vessel in the series is cocurrently purged with nonadsorbed product stream from the second vessel and the purge effluent from the first stage adsorption vessels is reintroduced into the first adsorption vessels as feed gas.

24 Claims, 1 Drawing Sheet

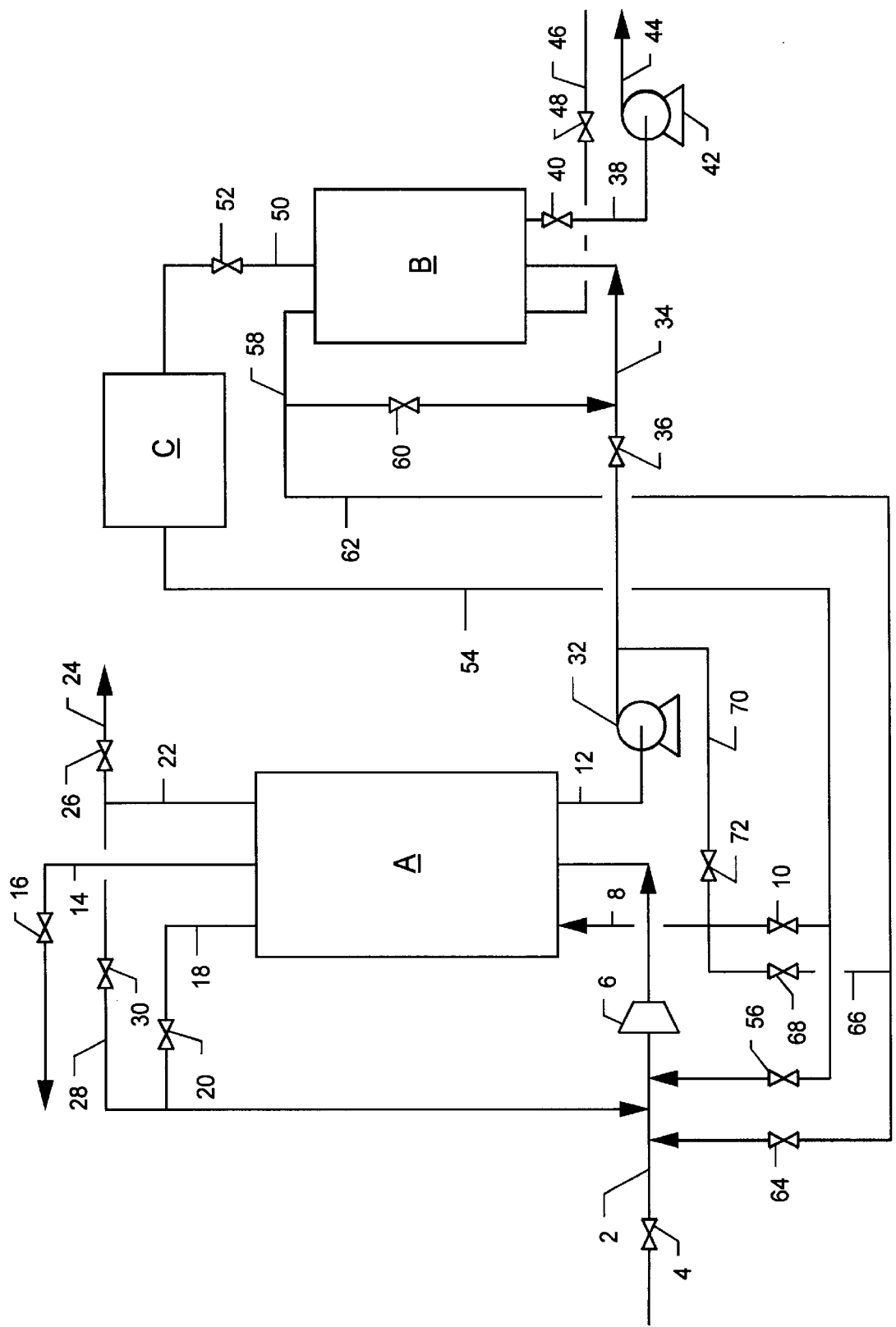

TWO STAGE PRESSURE SWING ADSORPTION PROCESS

FIELD OF THE INVENTION

This invention relates to pressure swing adsorption (PSA) gas mixture separation processes, and more particularly to gaseous PSA processes in which it is desired to recover the more strongly adsorbed component of the gas mixture in very high purity. Specifically, the invention is a two-stage PSA process in which the desorbed phase from the first PSA stage is subjected to a second PSA stage and the only product stream removed from the second PSA stage is the desorbed strongly adsorbed component.

BACKGROUND OF THE INVENTION

Components of gas mixtures are frequently separated from the gas mixtures by PSA. Although PSA is generally more useful when the desired component is the least strongly adsorbed component, this gas separation technique can be successfully used when the desired component is more strongly adsorbed by the selected adsorbent than are the other components of the gas mixture. For example, carbon monoxide can be separated from gas mixtures containing, in addition to carbon monoxide, hydrogen, carbon dioxide, methane and nitrogen by means of cuprous ion-containing adsorbents. Such mixtures often occur in syngas, a hydrogen and carbon monoxide mixture produced in hydrocarbon reforming processes. It is difficult, however, to recover carbon monoxide in high purity, even using copper-modified adsorbents, because carbon dioxide, methane and nitrogen are generally coadsorbed to some degree by most adsorbents.

Certain procedures, such as cocurrently purging the adsorbent with desorbed product gas before the evacuation step, enhance the purity of the strongly adsorbed product. However, it usually requires a considerable quantity of product gas purge to obtain reasonable purity of the desorbed product gas, and even when the purge gas effluent is recycled to the feed stream, the yield of product gas is low. Process improvements which increase the yield of strongly adsorbed product gas without sacrificing the product gas purity are continually sought. The present invention provides such an improvement.

SUMMARY OF THE INVENTION

The invention presents a two stage PSA process in which the nonadsorbed product gas from the second stage is recycled to the first stage. This increases the concentration of the desired strongly adsorbed component in the first stage, which reduces the concentration of impurities in the desorbed product gas passing from the first stage to the second stage.

In a broad embodiment, the invention comprises a process for separating a desired strongly adsorbed gas (adsorbable gas) from a feed gas mixture in a pressure swing adsorption system comprising at least two serially-connected stages, wherein each stage has a feed gas inlet, comprising the steps:

(a) subjecting the feed gas mixture to a pressure swing adsorption process comprising an adsorption mode and an adsorbent regeneration mode in one or more first adsorption zones containing an adsorbent which selectively adsorbs the adsorbable gas from the feed gas mixture, thereby producing a first adsorbable gas-depleted stream and a first adsorbable gas-enriched stream;

(b) subjecting the first adsorbable gas-enriched stream to a pressure swing adsorption process comprising an adsorption mode and an adsorbent regeneration mode in one or more second adsorption zones containing an adsorbent which selectively adsorbs the adsorbable gas from the first adsorbable gas-enriched stream, thereby producing a second adsorbable gas-depleted stream and a second adsorbable gas-enriched stream;

(c) recycling at least part of said second adsorbable gas-depleted stream to the one or more first adsorption zones.

According to a preferred embodiment, step (a) also includes a cocurrent purge mode prior to the adsorbent regeneration mode.

According to another preferred embodiment, step (c) comprises passing at least part of the second adsorbable gas-depleted stream produced in the one or more second adsorption zones cocurrently through the one or more first adsorption zones during the purge mode of the first stage, thereby producing a purge effluent. A more preferred aspect of this preferred embodiment further comprises recycling at least part of the purge effluent to the one or more first adsorption zones during the adsorption mode of step (a).

Another preferred embodiment further comprises including a cocurrent purge mode in step (b) prior to the step (b) bed regeneration mode of the broad embodiment and passing second adsorbable gas-enriched stream produced in the second stage of the system cocurrently through the one or more second adsorption zones during the step (b) cocurrent purge mode, thereby producing a second adsorption zone purge effluent, and recycling the second adsorption zone purge effluent to the one or more second adsorption zones during the adsorption mode of step (b), to the one or more first adsorption zones, or to both the one or more second adsorption zones during the adsorption mode of step (b) and the one or more first adsorption zones. In a preferred aspect of this embodiment, the second zone purge effluent is recycled to the one or more second adsorption zones during the adsorption mode of step (b).

In another preferred aspect of the broad embodiment, during the adsorption mode of step (a) the feed gas mixture is passed through the one or more first adsorption zones and afterwards, also during the adsorption mode of step (a), the second purge effluent is passed through the one or more first adsorption zones. In another preferred aspect of this embodiment, at least part of the second adsorption zone purge effluent is passed cocurrently through the one or more first adsorption zones during the purge mode of step (a), thereby producing additional first adsorption zone purge effluent, and at least part of the additional first zone purge effluent is recycled to the one or more first adsorption zones during the adsorption mode of step (a). In a most preferred aspect, the second adsorption zone purge effluent is passed cocurrently through the one or more first adsorption zones during the cocurrent purge mode of step (a) afterwards, also during the cocurrent purge mode of step (a), the second adsorbable gas-depleted stream is passed through the one or more first adsorption zones.

In a refinement of the broad embodiment, the process further comprises cocurrently depressurizing the one or more first adsorption zones, thereby producing a cocurrent depressurization effluent. In a preferred aspect of this refinement, at least part of the cocurrent depressurization effluent is recycled to the one or more first adsorption zone during the adsorption mode of step (a).

The process of the invention is particularly useful when the adsorbable gas is carbon monoxide. In this embodiment, the adsorbent in the one or more first adsorption zones, or the adsorbent in the one or more second adsorption zones, or the adsorbent in the one or more first adsorption zones and the one or more second adsorption zones contain cations independently selected from copper$^+$ ions, silver$^+$ ions, palladium$^{++}$ ions or mixtures of these. In a preferred aspect of this embodiment, the adsorbent in the one or more first adsorption zones, or in the one or more second adsorption zones or in both the one or more first adsorption zones and the one or more second adsorption zones comprises a porous substrate independently selected from carbon, silica gel, alumina, zeolites or mixtures of these. In a particularly preferred aspect of this embodiment, the adsorbent in the one or more first adsorption zones contains copper$^+$ ions and the adsorbent in the one or more second adsorption zones contains copper$^+$ and/or silver$^+$ ions. In a most preferred aspect of this embodiment, the adsorbent in the one or more first adsorption zones is copper$^+$-containing alumina and the adsorbent in the one or more second adsorption zones is copper$^+$-containing alumina and/or silver$^+$-containing alumina. This most preferred aspect is ideal for separating a gas mixture which comprises carbon monoxide and carbon dioxide, carbon monoxide and methane or carbon monoxide, carbon dioxide and methane. Hydrogen may also be present in such gas mixtures.

The pressure swing adsorption process of steps (a) and (b) are generally carried out at the same or different temperatures in the range of about 0 to about 150° C. In preferred aspects, such as when the feed gas mixture comprises carbon monoxide and hydrogen, the pressure swing adsorption process of step (b) of the broad embodiment is preferably carried out at a temperature higher than the temperature at which the pressure swing adsorption process of step (a) is carried out. In this case, the pressure swing adsorption process of step (b) is often carried out at a temperature in the range of about 30 to about 150° C.

The adsorption modes of the pressure swing adsorption process of steps (a) and (b) are generally carried out at a pressure in the range of about 1 to about 70 bara. The purge mode of step (a) of the preferred embodiment is generally carried out at a pressure in the range of about 1 to 10 bara. The adsorbent regeneration modes of steps (a) and (b) of the broad embodiment are generally carried out at pressures in the range of about 50 millibara to about 5 bara.

BRIEF DESCRIPTION OF THE DRAWING

FIG. 1 is a schematic representation of one embodiment of the invention comprising a two-stage serially-connected PSA system with purge gas recycle features. Valves, lines and equipment that are not necessary for an understanding of the invention have not been included in the drawing.

DETAILED DESCRIPTION OF THE INVENTION

The invention is a process for separating a selected gas in high purity from a gas mixture by a PSA process carried out in a series of two or more adsorption zones arranged in series with the desorbed product gas from the first adsorption zone in the series being used as feed to the second adsorption zone. The selected gas is the most strongly adsorbed gas in each zone of the series. In a key step of the process of the invention, at least part of the nonadsorbed gas product from the second adsorption zone in the series is passed cocurrently through the adsorbent bed(s) in the first adsorption zone as a purge stream, and the resulting purge effluent from the first adsorption zone is recycled to the first adsorption zone. This feature increases the concentration of the selected gas in the feed stream. It has been discovered that increasing the ratio of the preferentially adsorbed component to other components in the adsorption zone nonlinearly reduces the concentration of these other components in the desorbed product stream.

Each adsorption zone of the system comprises a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the desired gas component, while one or more other units are undergoing regeneration to desorb and collect the adsorbed gas component. Operation of the adsorption systems of the invention is cyclical. In the preferred adsorption process, cycles are repeatedly carried out in a manner such that production of the desired product gas is substantially continuous.

The system illustrated in the drawing is the simplest version of a plant useful for practice of the invention. In the drawing, the first and second adsorption zones are represented as the single adsorption vessels A and B. In such a system the adsorption zones are operated intermittently. Since the desorbed gas from vessel A generally constitutes a small percent of the feed gas entering vessel A, it can readily be appreciated that vessel B can be considerably smaller than vessel A. The invention will be described in detail as practiced with the illustrated arrangement, it being understood, however, that the illustrated arrangement is merely exemplary of systems suitable for practicing the process of the invention, and the system can comprise any of the above-described equipment arrangements.

The overall system is provided with feed gas inlet line 2, which, in the illustrated embodiment, is provided with valve 4 and optionally provided with feed gas pumping means 6, which may be, for example, a compressor or a blower. Prepurification units, such as condensers, dryers, etc. (not shown), may also be positioned upstream of the bed of adsorbent in vessel A. Also attached to the feed inlet end of vessel A is purge gas inlet line 8, which is provided with valve 10 and may be provided with a gas pumping means, and vessel A evacuation line 12. On its outlet end, vessel A is provided with nonadsorbed product gas line 14, fitted with valve 16, purge effluent line 18, provided with valve 20, the downstream of which is connected to feed gas inlet line 2 at a point upstream of gas pumping means 6, and cocurrent depressurization line 22. Line 18 may also be connected via a line (not shown) to other downstream processing units. The downstream end of line 22 is connected to waste gas discharge line 24, fitted with valve 26, and depressurization gas recycle line 28, provided with valve 30. Line 28 is connected on its downstream end to feed gas inlet line 2, also at a point upstream of gas pumping means 6. Gas storage vessels (not shown) may be positioned along lines 18 and 28 to store depressurization gas and purge gas effluent for introduction into vessel A in subsequent adsorption steps. If the depressurization and purge effluent gases are to be combined and introduced together into vessel A as feed a single storage vessel can be used in place of separate storage vessels.

Vessel A evacuation line 12 is connected to the inlet end of vacuum pump 32. On its outlet end, vacuum pump 32 is connected to vessel B feed line 34 which is provided with valve 36 and is connected to the feed inlet end of vessel B. A gas storage vessel (not shown) may be positioned in line 34, preferably upstream of valve 36, to hold gas desorbed from vessel A pending its use as feed for vessel B. Also connected to the inlet end of vessel B is vessel B evacuation line 38, which is provided with valve 40. The downstream end of line 38 is connected to the inlet of vacuum pump 42. Desorbed product gas line 44 is connected to the outlet end of pump 42. A desorbed product gas storage vessel (not shown) is generally positioned downstream of line 44. Purge gas line 46, provided with valve 48, connects the gas storage vessel downstream of line 44 to the inlet end of vessel B.

On its outlet end, vessel B is connected to nonadsorbed product gas buffer tank C via line 50, which is provided with valve 52. Line 54 joins buffer tank C to purge gas inlet line 8 at a point upstream of valve 10, and it also communicates with feed gas line 2 via valve 56. Since gas in this stream is at relatively low pressure, line 54 joins line 2 at a point upstream of gas pumping means 6. The nonadsorbed product gas outlet end of vessel B is also provided with purge effluent line 58, which communicates with line 34 through valve 60. Line 62, fitted with valve 64, joins line 58 to feed line 2, upstream of gas pumping means 6. Purge gas line 66, fitted with valve 68 joins line 62 to line 8, downstream of valve 10. Purge line 70, provided with valve 72, connects line 34, or preferably the storage vessel in line 34, to line 8 at a point downstream of valve 10.

The adsorbent used in vessels A and B will depend upon the particular gas to be separated from the gas mixture as the strongly adsorbed component. The same adsorbent may be used in each vessel, or the adsorbent used in vessel A may be different from the one used in vessel B. Typical adsorbents include silica gel, alumina, activated carbon, carbon molecular sieves, natural zeolites, such as mordenite, faujasite, clinoptilolite, chabazite, etc. and synthetic zeolites, such as types A, X and Y zeolites. When the strongly adsorbed gas being separated from the gas mixture is carbon monoxide, preferred adsorbents include $copper^+$-, $silver^+$-, and $palladium^{++}$ -containing adsorbents of the above classes. The choice of adsorbent for use in the one or more first adsorption zones is independent of the choice of adsorbent for use in the one or more second adsorption zones. In other words, one adsorbent may be used in the one or more first adsorption zones and a different adsorbent may be used in the one or more second adsorption zones. Preferred carbon monoxide-selective adsorbents include copper ion and silver ion containing adsorbents, such as $copper^+$ salt- or $silver^+$ salt-containing alumina and $copper^+$- and $silver^+$-exchanged zeolites.

The pressures at which the PSA process adsorption step in vessels A and B are carried out is a matter of choice. Typically, the adsorption is carried out at a pressure at or above about 1 bar, absolute (bara). The upper pressure limit is determined by economics and limitations of the adsorption system and, in general, it is desirably about 70 bara, preferably about 20 bara and most preferably about 5 bara. The pressure at which adsorbent regeneration in vessels A and B is carried out is likewise a matter of choice, and the minimum pressure depends upon whether or not vacuum equipment is used to withdraw adsorbed gas from these vessels. Typically, the lower pressure limit during adsorbent regeneration in these vessels can be as low as 50 mbara (millibar absolute), but is preferably not lower than about 150 mbara, and is most preferably not lower than about 200 mbara. Adsorbent regeneration may be carried out at pressures as high as 5 bara, but is preferably carried out at pressures not higher than about 2 bara, and most preferably at pressures not above about 1 bara. The cocurrent purge of step (a) of the process is generally carried out at a pressure in the range of about 1 to about 10 bara. The adsorption and evacuation pressures in vessels A and B may be the same or different.

Although the system and process may be used to separate the components of any gas mixture, it will be described as it applies to the separation of carbon monoxide, as the sorbate, from a gas mixture comprised of hydrogen, carbon monoxide, carbon dioxide, methane and nitrogen.

The PSA process carried out in vessel A will be described as including a feed pressurization step, an adsorption step, a cocurrent depressurization step, a low pressure cocurrent purge step and a countercurrent evacuation step, although it may include other steps. As used in this description, the cocurrent direction is the direction from the feed inlet of the adsorption vessel toward the nonadsorbed product gas outlet, and the countercurrent direction is the direction opposite the cocurrent direction. When the PSA system represented by vessel A is a multivessel system with adsorption vessels operated out of phase, the cycle may include one or more bed equalization steps, during which, for example, gas is passed from the adsorption vessel which has just finished its adsorption step to the vessel which has just finished its adsorbent regeneration step. The order of the vessel A cocurrent depressurization and cocurrent purge steps is not critical to the invention. For example, in the process carried out in the illustrated system, the cocurrent purge step may precede or follow the cocurrent depressurization step. If the purge step precedes the depressurization step, the purge step will be carried out at higher pressure than would be the case if it follows the cocurrent depressurization step.

The PSA process carried out in vessel B will be described as including an adsorption step, a cocurrent purge step and a countercurrent evacuation step, although it may include a cocurrent depressurization step before or after the cocurrent purge step. Alternatively, the cocurrent purge step may be replaced by a cocurrent depressurization step, or it may be eliminated altogether. When neither a cocurrent purge step nor a cocurrent depressurization step is included in the vessel B PSA cycle, all of the gas in vessel B will be sent to desorbed product during the evacuation step. As was the case with the vessel A part of the system, the system represented by vessel B may comprise two or more adsorption vessels operated out of phase, in which situation the PSA process carried out in the multivessel system could include equalization steps.

At the beginning of the feed pressurization step, valve 4 is opened and all other valves of this part of the system are closed. Feed gas is now introduced into vessel A. When the pressure in vessel A reaches the desired adsorption pressure, valve 14 is opened to start the adsorption step. Feed gas at the desired adsorption pressure is introduced into vessel A through line 2. The feed gas passes upwardly through bed A, and as it does so carbon monoxide is adsorbed by the adsorbent in vessel A. Nonadsorbed product gas, comprised substantially of hydrogen and containing carbon dioxide, methane, nitrogen and a small amount of carbon monoxide, leaves vessel A through line 14 and passes to product storage or to a downstream application or further process operation. As the vessel A adsorption step proceeds, the adsorbed carbon monoxide front advances through the bed of adsorbent toward the nonadsorbed product outlet end of vessel A. When it reaches the desired end point, which is preferably prior to breakthrough of carbon monoxide into line 14, the vessel A adsorption step is terminated and the cocurrent depressurization step begun.

During the preferred cocurrent depressurization step of the process, valve 30 is opened and all other valves of the vessel A part of the system are closed. Void space gas is discharged from vessel A during cocurrent depressurization and, preferably, at least part of it is sent to the above-mentioned cocurrent depressurization gas storage vessel to await introduction into vessel A at the appropriate time during the next vessel A adsorption step. When the pressure in vessel A drops to the desired level (usually above the evacuation pressure), the cocurrent depressurization step is terminated and the cocurrent purge step is started.

To effect cocurrent purge, valves 10 and 20 are opened and valve 30 is closed. Purge gas from buffer tank C, which is enriched in carbon monoxide, then flows cocurrently through vessel A and purges impurity gases from the adsorbent bed in this vessel. The purge gas-impurity gas mixture passes out of vessel A through line 18 and, preferably, at least part of it goes to the above-mentioned purge gas storage vessel, or to the cocurrent depressurization gas storage vessel, if the two gas streams are to be mixed, to await introduction into vessel A at the appropriate time during the next adsorption step. When vessel A is purged to the desired extent the cocurrent purge step is terminated by closing valves 10 and 20.

The last step of the vessel A adsorption cycle is the countercurrent evacuation step. This step is accomplished by closing all valves of the vessel A system and activating vacuum pump 32, when pump 32 is included in the system. If the lowest pressure to which vessel A is reduced is above the desired vessel B adsorption pressure, then vacuum pump 32 is not necessary. However, when the lowest evacuation pressure in vessel A is below the adsorption pressure in vessel B, which is usually the case, a gas pumping means, such as a gas compressor and/or vacuum pump, is used to evacuate vessel A. During this step, carbon monoxide-enriched gas (enriched relative to the carbon monoxide concentration of the feed gas to vessel A) is desorbed from the adsorbent in vessel A, withdrawn from vessel A through line 12 and either stored in the above-described vessel A desorbed product gas storage vessel to await introduction into vessel B as feed gas, or passed directly to vessel B. The vessel A evacuation step is terminated when the pressure in vessel A is reduced to the desired value. Upon completion of the vessel A evacuation step, the current adsorption cycle ends and the adsorption cycle is repeated, beginning with the above-described vessel A feed pressurization step.

The vessel B adsorption cycle can be conducted independently of, or in coordination with the vessel A adsorption cycle. The preferred vessel B adsorption cycle includes a feed pressurization step, an adsorption step, a cocurrent purge step and a countercurrent evacuation step. The feed pressurization step is initiated by opening valve 36 and passing carbon monoxide-enriched gas desorbed from vessel A, or from the vessel A desorbed product gas storage vessel, cocurrently into vessel B. When vessel B reaches the desired adsorption pressure the adsorption step is started by opening valve 52. As the carbon monoxide-enriched gas from vessel A passes through the adsorbent in vessel B additional carbon monoxide is adsorbed by this adsorbent and a nonadsorbed product gas which is depleted in carbon monoxide (relative to carbon monoxide concentration of the carbon monoxide-enriched feed gas entering vessel B) passes out of vessel B through line 50. This gas is stored in vessel C to await the next vessel A cocurrent purge step. As the vessel B adsorption step proceeds, the carbon monoxide front in the adsorbent in vessel B advances toward the nonadsorbed product outlet end of vessel B. When it reaches the desired end point the vessel B adsorption step is terminated and the vessel B cocurrent purge step is initiated.

Purging of vessel B is accomplished by closing valves 36 and 52 and opening valve 48. Purge gas taken from the downstream carbon monoxide-rich product gas storage vessel is then introduced into vessel B via line 46 and passed through the adsorbent in vessel B at the desired pressure, which may be at the adsorption pressure, but is usually at a pressure intermediate the desired adsorption pressure and the lowest evacuation pressure. Purge effluent, generally containing a significant amount of carbon monoxide and impurity gases, exits vessel B through line 58 and is stored to await introduction into vessel B as supplemental feed at the appropriate time during the next adsorption step in this vessel. Alternatively, if system B comprises a plurality of adsorption vessels operated out of phase, valve 60 may be opened and the purge effluent from vessel B sent directly to an on line adsorption vessel of this part of the system. When the adsorbent in vessel B is purged to the desired extent, the vessel B purge step is terminated and countercurrent evacuation of vessel B is begun. This is accomplished by closing valve 48 and valve 60 (if open), opening valve 40 and activating vacuum pump 42. Vessel B is then evacuated. When vessel B is evacuated to the desired extent, the countercurrent evacuation step is terminated, ending the current vessel B adsorption cycle. The adsorption cycle is repeated, beginning with the above-described vessel B feed pressurization step.

When both vessel A cocurrent depressurization gas and cocurrent purge effluent are recycled to vessel A, they may be combined with feed gas entering the system through line 2 and the mixed gas introduced into vessel A during the adsorption step, or cocurrent depressurization gas and purge effluent may be separately introduced into vessel A at the tail end of the feed step, such as after introduction of the fresh feed is terminated. Since the depressurization gas and purge effluent are generally richer in carbon monoxide than is the fresh feed, it is preferred to pass the depressurization gas and purge effluent through the adsorbent in vessel A after passage of the fresh feed therethrough, because this will result in the production of a higher purity carbon monoxide desorbed product gas during the evacuation step. The cocurrent depressurization gas contains a higher percentage of carbon monoxide than does the fresh feed gas, and the purge effluent contains a higher percentage of carbon monoxide than does the cocurrent depressurization gas; accordingly, the most preferred order of feeding these gases into vessel A during the adsorption step is fresh feed gas first, then cocurrent depressurization gas, then purge effluent.

In a variation of the above-described method of practicing the invention, some or all of the cocurrent depressurization gas can be discharged from the system through line 24 by opening valve 26 during the vessel A cocurrent depressurization step. This may be the case when the cocurrent depressurization stream is lean in carbon monoxide. Diminished benefit would be realized by recycling to the feed gas that has a lower carbon monoxide concentration than does the fresh feed. Since, at the end of the adsorption step, the void space gas at the nonadsorbed gas end of vessel A may contain a lower concentration of carbon monoxide than does the void space gas near the feed inlet end of vessel A, it may be preferable to discharge a first cut of cocurrent depressurization gas from the system and recycle a second cut to the feed inlet line. This can be accomplished by opening valve 26 in the early part of the cocurrent depressurization step, and later during this step closing valve 26 and opening valve 30. Cocurrent depressurization gas discharged from the system can be used as fuel or otherwise processed.

In another embodiment of the invention, vessel B nonadsorbed product gas from buffer tank C and/or vessel B purge effluent from line 58 are passed directly into vessel A as feed together with or separately from the fresh feed being introduced into this vessel. Since the vessel B purge gas is richer than the vessel B nonadsorbed gas product, it is preferable to introduce these streams into vessel A as feed after termination of flow of fresh feed into vessel A. The vessel B nonadsorbed product gas and/or the vessel B purge effluent can be combined with the vessel A cocurrent depressurization gas and/or the vessel A purge effluent before introduction of these gases into vessel A, or any or all of these streams may be separately introduced into vessel A as feed. It is preferable to introduce these streams and the fresh feed into vessel A during the vessel A adsorption step in the order of increasing carbon monoxide concentration. Since the vessel B purge effluent has a higher concentration of carbon monoxide than any of the other streams, this stream is preferably the last stream to be introduced into vessel A. Similarly, the vessel B nonadsorbed product gas in buffer tank C generally has a higher carbon monoxide concentration than the vessel A cocurrent depressurization gas stream and the vessel A cocurrent purge stream, so the latter two streams are preferably introduced into vessel A prior to introduction of part of the buffer tank C stream.

As can be seen from the drawing, vessel A can be purged with gas from one or more of three streams: the buffer tank C stream in line 54, the vessel B purge effluent stream in line 66 and/or vessel A desorbed gas stream in line 70. Flow of these gases into vessel A is controlled by valves 10, 68 and 72, respectively. As was the case with the introduction of the various streams into vessel A during the feed step, if more than one of these streams are used to cocurrently purge vessel A, the streams are preferably introduced into vessel A in the order of increasing carbon monoxide concentration. Thus, it is preferred to purge vessel A with purge effluent from line 62 after purging the vessel with nonadsorbed gas from line 54 because the line 62 gas is more concentrated in carbon monoxide than is the line 54 gas. If the desorbed gas from vessel A in line 70 is more concentrated than the other gases, then the line 70 gas is preferably introduced into vessel A as purge gas after purging vessel A with either or both of the other streams, i. e. the streams in lines 62 and/or 54. In any event, if vessel A desorbed product gas from line 34 is used to purge vessel A, only a fraction of this gas is used as purge gas, since a sufficient amount of this gas must be fed into vessel B to provide adequate product stream and recycle stream. The preferred procedure is to use all of the desorbed gas from vessel A as feed for vessel B, to recycle all of the vessel B purge effluent passing through line 58 to line 34 as feed for vessel B, and to use as much of the gas stored in buffer tank C as vessel A purge gas as is necessary to achieve the desired purge of vessel A and then recycle the remaining portion of this gas to line 2 as feed to vessel A during its adsorption step.

If it is desired to purge vessel A at a pressure above the pressure at which purge gas is available in buffer tank C or in lines 62 or 70, it may be necessary to use a purge gas pressurization means, such as a gas compressor. The gas pressurization means can, for example, be conveniently positioned in line 8, downstream of valve 10. Similarly, it may be desirable to pressurize the gas recycled to vessel B through line 58 or desorbed gas used to purge vessel B via line 46. This can be accomplished using a gas pressurization means. In some equipment arrangements, the same gas pressurization means can be used to pressurize the gas in lines 46, 54, 58, 60 and 62 to the desired purge pressure.

It will be appreciated that it is within the scope of the present invention to utilize conventional equipment to monitor and automatically regulate the flow of gases within the system so that it can be fully automated to run continuously in an efficient manner.

The Table illustrates a particular useful embodiment of the invention in which a single vacuum pump and a single purge gas pump are used for both the first and second stage adsorption processes. In the illustrated operation the first stage adsorption process is carried out in four adsorption vessels operated 90° out of phase, and the second stage adsorption process is carried out in a pair of adsorption vessels operated 180° out of phase. The steps of the first stage process are adsorption, cocurrent depressurization (COC), purge, depressurization equalization (EQ(D)), evacuation, repressurization equalization (EQ(R)) and pressurization; and the steps of the second stage process are adsorption, purge, and evacuation, with an idle step between the purge and evacuation steps. Note that the vacuum pump (VP) and purge pump (PP) are in continuous service throughout the process. Note also that two complete cycles are carried out in the second stage for each complete cycle carried out in the first stage.

TABLE

| BED A1 | ADSORPTION | | COC | PURGE (PP) | EQ (D) | EVACUATION (VP) | EQ (R) | PRESSURIZATION | |
|---|---|---|---|---|---|---|---|---|---|
| BED A2 | EQ (R) | PRESSURIZATION | ADSORPTION | | COC | PURGE (PP) | EQ (D) | EVACUATION (VP) | EQ (R) |
| BED A3 | EQ (D) | EVACUATION (VP) | EQ (R) | PRESSURIZATION | | ADSORPTION | COC | PURGE (PP) | EQ (D) |
| BED A4 | COC | PURGE (PP) | EQ (D) | EVACUATION (VP) | EQ (R) | PRESSURIZATION | | ADSORPTION | |

| BED B1 | EVA (VP) | ADSORPTION | PURGE (PP) | IDLE | EVAC (VP) | ADSORPTION | PURGE (PP) | IDLE | EVA (VP) |
|---|---|---|---|---|---|---|---|---|---|
| BED B2 | PUR (PP) | IDLE | EVAC (VP) | ADSORPTION | PURGE (PP) | IDLE | EVAC (VP) | ADSORPTION | PUR (PP) |

The invention is further illustrated by the following example in which, unless otherwise indicated, parts, percentages and ratios are on a volume basis.

EXAMPLE

The system on which this hypothetical example is based is similar to the two-stage system illustrated in the drawing, except that the nonadsorbed product gas and the purge effluent from the second stage beds are combined and all of this gas is used as cocurrent purge gas for the first stage beds, and the cocurrent depressurization gas and purge effluent from the first stage are combined and recycled to the first stage beds and mixed with feed gas. The first stage PSA adsorption process is carried out in four adsorption vessels operated 90° out of phase, and the second stage PSA adsorption process is carried out in a pair of adsorption vessels operated 180° out of phase. Each bed of the first stage was assumed to contain 4.0 $m^3$ of $Cu^+$-exchanged type Y zeolite and each bed of the second stage was assumed to contain 1.8 $m^3$ of $Cu^+$-exchanged type Y zeolite. The beds of the first stage are assumed to operate at half-cycle time of 420 sec and at a temperature of about 70° C., and the beds in the second stage are assumed to operate at about 80° C. The cycle assumed to be carried out in the first stage beds comprises the steps adsorption, cocurrent depressurization, equalization (depressurization), cocurrent purge, evacuation, equalization (repressurization) and feed pressurization, and the cycle assumed to be carried out in the second stage beds comprises the steps adsorption, cocurrent purge and evacuation.

The feed stream, comprised of (on a volume basis) 9.6% carbon monoxide, 8.0% methane, 7.0% carbon dioxide and 75.4% hydrogen is introduced into the first stage vessels at a pressure of 18 bara and a flow rate of 14.1 $m^3$/min. The first stage nonadsorbed product has a flow rate of 12.9 $m^3$/min and comprises 1.2% carbon monoxide, 8.7% methane, 7.6% carbon dioxide a nd 82.4% hydrogen, and the second stage desorbed gas product stream has a flow rate of 1.2 $m^3$/min and comprises 99.6% carbon monoxide, 95 ppm methane, 4100 ppm carbon dioxide and 130 ppm hydrogen. The desorbed product gas from the first stage beds comprises 92.8% carbon monoxide, 2800 ppm methane, 6.1% carbon dioxide and 8000 ppm hydrogen. The overall carbon monoxide recovery is greater than 85%. This example shows that a high purity carbon monoxide product stream can be expected from practicing an embodiment of the invention.

Although the invention has been described with particular reference to specific equipment arrangements and a specific experiment, these features are merely exemplary of the invention and variations are contemplated. For example, The nonadsorbed gas product and the purge effluent from the second stage adsorber(s) can be used as cocurrent purge gas for the first stage adsorber(s), as described in the Example. Also, desorbed product gas from the second stage adsorber(s) can be used as cocurrent purge gas for the first stage adsorber(s). The scope of the invention is limited only by the breadth of the appended claims.

What is claimed is:

1. A process for separating an adsorbable gas from a feed gas mixture in a pressure swing adsorption system comprising at least two serially-connected stages each having feed gas inlets comprising the steps:

(a) subjecting said feed gas mixture to a pressure swing adsorption process comprising a pressurization mode, an adsorption mode, a cocurrent purge mode and an adsorbent regeneration mode in at least one first adsorption zone containing an adsorbent which more strongly adsorbs said adsorbable gas than all other components of said feed gas mixture, thereby producing a first adsorbable gas-depleted stream and a first adsorbable gas-enriched stream;

(b) subjecting said first adsorbable gas-enriched stream to a pressure swing adsorption process comprising an adsorption mode and an adsorbent regeneration mode in at least one second adsorption zone containing an adsorbent which more strongly adsorbs said adsorbable gas than all other components of said first adsorbable gas-enriched stream, thereby producing a second adsorbable gas-depleted stream and a second adsorbable gas-enriched stream;

(c) recycling at least part of said second adsorbable gas-depleted stream to said at least one first adsorption zone during said pressurization mode, during said cocurrent purge mode, or during both said pressurization mode and said cocurrent purge mode.

2. The process of claim 1, wherein step (c) comprises passing at least part of said second adsorbable gas-depleted stream cocurrently through said at least one first adsorption zone during the cocurrent purge mode of step (a), thereby producing a purge effluent.

3. The process of claim 2, further comprising recycling at least part of said purge effluent to said at least one first adsorption zone during the adsorption mode of step (a).

4. The process of claim 1 or claim 2, wherein step (b) includes a cocurrent purge mode, and further comprising passing at least part of said second adsorbable gas-enriched stream cocurrently through said at least one second adsorption zone during the step (b) cocurrent purge mode, thereby producing a second adsorption zone purge effluent, and recycling at least part of said second adsorption zone purge effluent to said at least one second adsorption zone during the adsorption mode of step (b), to said at least one first adsorption zone, or to both said at least one second adsorption zone during the adsorption mode of step (b) and to said at least one first adsorption zone.

5. The process of claim 4, wherein said second zone purge effluent is recycled to said at least one second adsorption zone during the adsorption mode of step (b).

6. The process of claim 4, wherein during the adsorption mode of step (a) said feed gas mixture is passed through said at least one first adsorption zone and subsequent thereto said second purge effluent is passed therethrough.

7. The process of claim 4, further comprising passing said second adsorption zone purge effluent cocurrently through said at least one first adsorption zone during the step (a) cocurrent purge mode, thereby producing additional first adsorption zone purge effluent, and then recycling at least part of said additional first adsorption zone purge effluent to said at least one first adsorption zone during the step (a) adsorption mode.

8. The process of claim 7, wherein, during said step (a) cocurrent purge mode, at least part of said second adsorption zone purge effluent is passed cocurrently through said at least one first adsorption zone after at least part of said second adsorbable gas-depleted stream is passed therethrough.

9. The process of claim 1 or claim 2, wherein said adsorbable gas is carbon monoxide.

10. The process of claim 9, wherein the adsorbent in said at least one first adsorption zone, the adsorbent in said at least one second adsorption zone or the adsorbents in said at least one first adsorption zone and said at least one second adsorption zone contain cations independently selected from $copper^+$ ions, $silver^+$ ions, $palladium^{++}$ ions or mixtures of these.

11. The process of claim 10, wherein the adsorbent in said at least one first adsorption zone, in said at least one second adsorption zone or in said at least one first adsorption zone and said at least one second adsorption zone independently comprises a porous substrate independently selected from carbon, silica gel, alumina, zeolites or mixtures of these.

12. The process of claim 11, wherein the adsorbent in said at least one first adsorption zone contains copper$^+$ ions and the adsorbent in said at least one second adsorption zone contains copper$^+$ ions, silver$^+$ ions or both of these.

13. The process of claim 12, wherein the adsorbent in said at least one first adsorption zone is copper$^+$-containing alumina and the adsorbent in said at least one second adsorption zone is copper$^+$-containing alumina, silver$^+$-containing alumina or both of these.

14. The process of claim 13, wherein said feed gas mixture further comprises carbon dioxide, methane or both carbon dioxide and methane.

15. The process of claim 14, wherein said feed gas mixture additionally contains hydrogen.

16. The process of claim 9, wherein the pressure swing adsorption process of steps (a) and (b) are carried out at the same or different temperatures in the range of about 0 to about 150° C.

17. The process of claim 16, wherein the pressure swing adsorption process of step (b) is carried out at a temperature higher than the temperature at which the pressure swing adsorption process of step (a) is carried out.

18. The process of claim 16, wherein the pressure swing adsorption process of step (b) is carried out at a temperature in the range of about 30 to about 150° C.

19. The process of claim 18, wherein the purge mode of step (a) is carried out at a pressure in the range of about 1 to about 10 bara.

20. The process of claim 18, wherein the adsorbent regeneration modes of steps (a) and (b) are carried out at a pressure in the range of about 50 millibara to about 5 bara.

21. The process of claim 1, further comprising cocurrently depressurizing said at least one first adsorption zone, thereby producing a cocurrent depressurization effluent.

22. The process of claim 21, further comprising recycling at least part of said cocurrent depressurization effluent to said at least one first adsorption zone during the adsorption mode of step (a).

23. The process of claim 1, wherein the adsorption modes of steps (a) and (b) are carried out at a pressure in the range of about 1 to about 70 bara.

24. The process of claim 1, further comprising recycling part of said first adsorbable gas-enriched stream to said at least one first adsorption zone during said cocurrent purge mode of step (a).

* * * * *